Sept. 1, 1953    J. H. COOMBES ET AL    2,650,680
BRAKE MECHANISM WITH REMOVABLE SHOES
Filed May 18, 1949    2 Sheets-Sheet 2

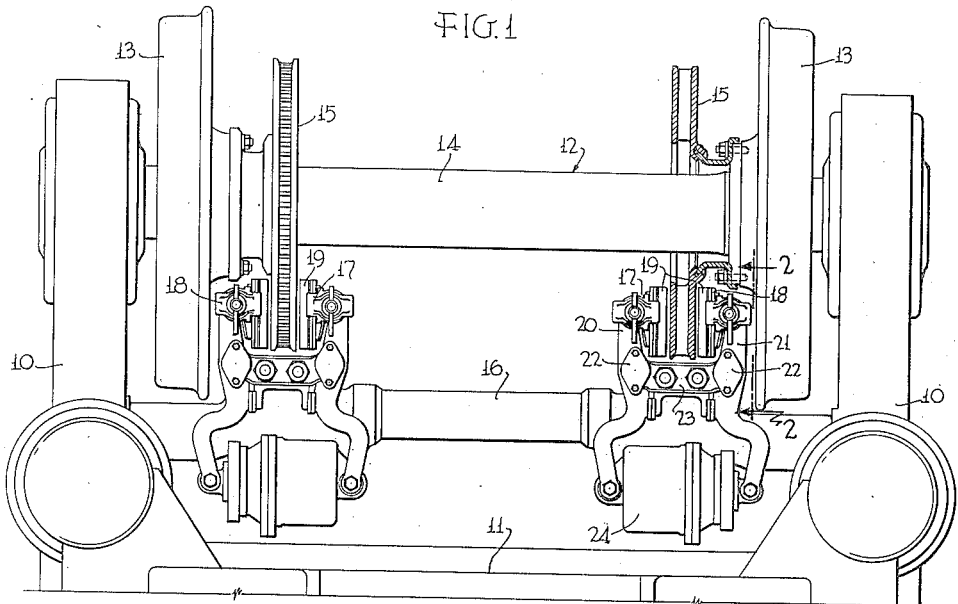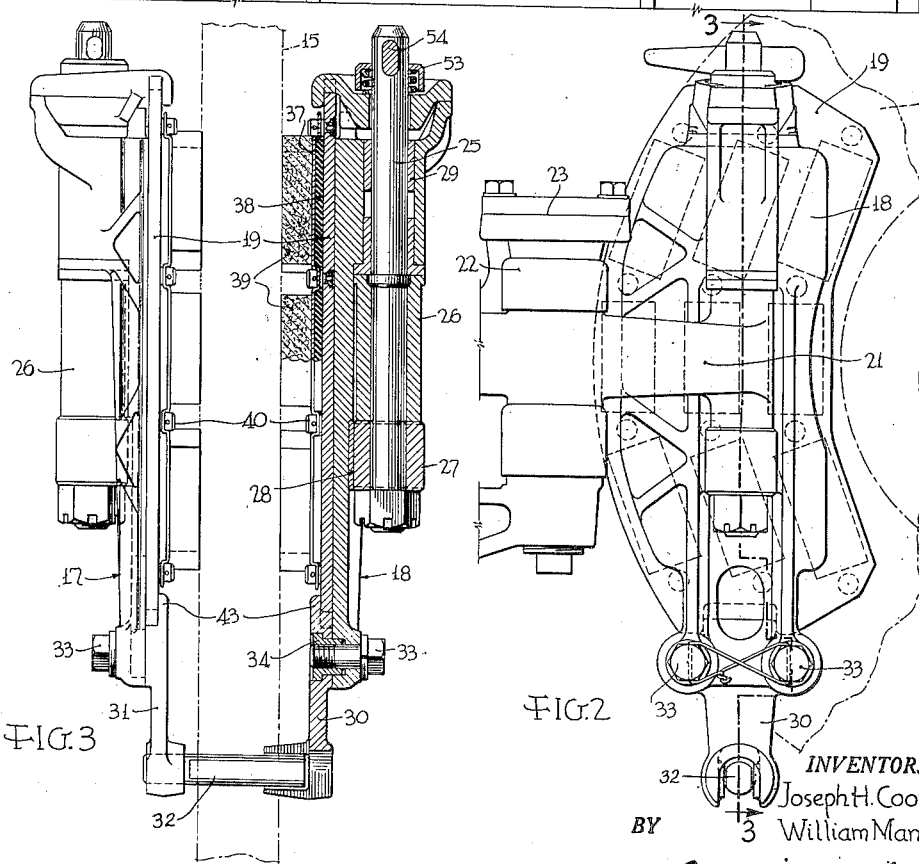

INVENTORS
Joseph H. Coombes.
William Mann.
BY Maurice A. Crews
ATTORNEY

Patented Sept. 1, 1953

2,650,680

UNITED STATES PATENT OFFICE 2,650,680

BRAKE MECHANISM WITH REMOVABLE SHOES

Joseph H. Coombes, Jenkintown, Pa., and William Mann, Grosse Pointe, Mich., assignors to The Budd Company, Philadelphia, Pa., a corporation of Pennsylvania Application May 18, 1949, Serial No. 93,924

4 Claims. (Cl. 188—59)

The invention relates to disc brakes and, more particularly, to such brakes in which the shoes are actuated by levers to engage opposite sides of a rotary brake disc.

The main object of the invention is to simplify the construction and mounting of the shoes associated with such brakes.

The heads upon which the shoes are detachably mounted, and the shoes themselves, are so designed as to require heads of but two kinds, rights and lefts, to be manufactured to fit the brakes associated with all four wheels of a usual four-wheel railway truck. The shoes are further designed so that they are identical at their opposite ends and designed to interlock with securing means associated with the opposite ends of the head interchangeably. This design permits a single form of shoe to fit each of the eight heads ordinarily present in a four-wheel railway truck brake.

Simplicity of manufacture and replacement of the shoes is thus achieved in a high degree, and the manner in which this is done will become apparent from the following detailed description when read in connection with the drawings forming a part of this specification.

In the drawings:

Fig. 1 is a plan view of one end of a railway truck equipped with the invention, parts being shown in section;

Fig. 2 is a fragmentary elevational view of an assembled mounting head and shoe with a fragment of the associated disc shown in dot-and-dash lines, the view representing an enlargement of parts shown in Fig. 1 as seen when looking in the direction of the arrows at the ends of the line 2—2 on said figure;

Fig. 3 is a part elevational and part sectional view of the opposed brake heads and the associated shoes arranged on the opposite sides of a rotary brake disc, indicated in dot-and-dash lines, the section being taken substantially along the line 3—3 of Fig. 2;

Figure 4:
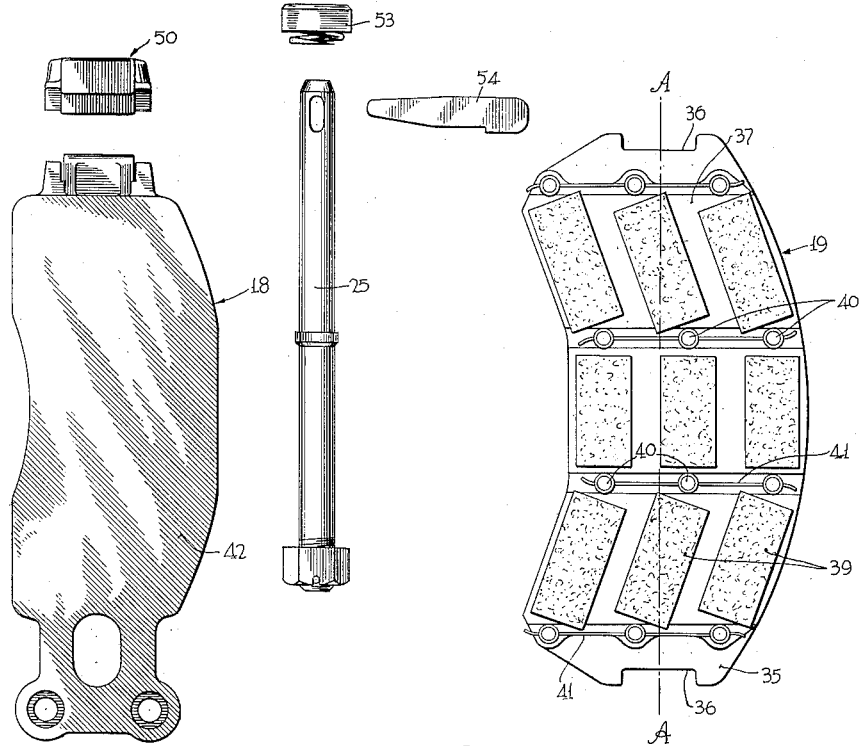
Fig. 4 is an exploded view of the parts entering into the head and shoe assembly.

In the drawings, the invention is shown applied to a specific form of railway truck, although it will be understood that it is applicable to a wide variety of such trucks and also to other types of vehicles.

The truck shown comprises longitudinally extending side frames, as 10, 10, transversely interconnected by transoms, as 11, and supported at the ends of the side frames by wheel and axle assemblies, as 12. The wheel and axle assemblies comprise wheels, as 13, 13, mounted on an axle, as 14, and each wheel has secured thereto a brake disc 15.

Mounted on a transverse support beam 16 extending between and carried by the side frames 10, 10 are the brake shoes and their actuating means associated with the respective discs.

Generally, the arrangement of shoes and actuating means associated with each disc are the same. Each comprises opposed heads 17 and 18 carrying the shoes 19, 19 for engaging the opposite braking faces of the disc 15. These heads 17 and 18 are pivotally carried by the levers 20 and 21 respectively.

These levers in turn are pivotally carried, as at 22, 22 by a bracket 23 rigidly secured to the support beam 16. The ends of the levers beyond their pivots 22, 22 and remote from the ends carrying the heads and shoes are shown interconnected by a cylinder actuator 24. When air is admitted between the cylinder and piston of the actuator, the shoes are pressed into engagement with the opposite sides of the disc to apply the brakes. Other forms of actuating means could be employed, as desired.

As shown, the heads 17 and 18 are mounted on their respective levers so that they may be readily applied or removed by means generally similar to that shown in Patent No. 2,402,386 for "Brake Mechanism," issued June 18, 1946.

Such means may comprise a pin 25 preferably having a driven fit with the eye 26 of the adjacent lever end. Secured to the lower end of this pin is a bearing sleeve 27 engaging an arcuate open bearing 28 formed on the back of the head, as 18. A wear plate, preferably, lines this bearing.

The upper end of the pin 25 extends through a closed bearing 29 on the head and projects upwardly thereabove to receive the means for securing the shoe and the head in place.

At the bottom, the heads 17 and 18, which are rights and lefts, are formed with downward extensions arranged symmetrically on opposite sides of their central longitudinal axis. This symmetrical formation is to adapt either of the heads 17 and 18 to receive demountably a bracket 30 or 31, which bracket serves not only to hold the lower end of the shoe associated with the head in place, but also integrally carries a part of the means which maintains the heads in parallelism in their movement toward and away from the opposite sides of the disc.

As shown in Fig. 3, one of the brackets, as 30, is formed with a vertical transversely extended guide slot, and the other, as 31, is provided with a laterally projecting pin 32 force-fitted in a hole in the bracket 31 and projecting into the guide slot. Each of the brackets is located on and secured to a respective head by a pair of laterally spaced bolts 33, 33, the nuts 34, 34 of which are countersunk into recesses formed in the brackets and heads. Since the connections of the brackets to the heads are symmetrical about the vertical transverse axis of the heads, it will be seen that the brackets 30 and 31 may be secured interchangeably to the heads 17 and 18. This arrangement permits the furnishing of the entire four-wheel brake organization with but two forms of heads, namely, rights and lefts.

As shown in Fig. 4, the shoes 19 are arcuate in form and have end portions which are similarly formed on opposite sides of the general plane of symmetry of the shoes indicated by the line A—A. The shoes comprise a flat backing plate 35 which may be stamped out of sheet metal with similar notches 36 at each end. To the backing may be secured a lining similar to that shown in Patent No. 2,451,326 for "Brake Shoe Assembly," issued October 12, 1948, said lining consisting of a thin sheet metal plate 37 formed to provide shallow pockets on one side thereof adapted to receive rubber pads 38 compressed between the plate 37 and the backing plate 35, the opposite sides of the sheet metal plate 37 having secured thereto spaced blocks 39 of brake lining material. The lining is removably held in place by projections 40 and retaining wires 41 passing through openings in the projections. Other suitable forms of lining could be used with the backing plate 35 if desired.

In view of the form of the shoe and the manner of mounting it removably on the head, it will be seen that but one form of shoe is required, and that it may be mounted interchangeably upon any of the heads.

Figure 5:
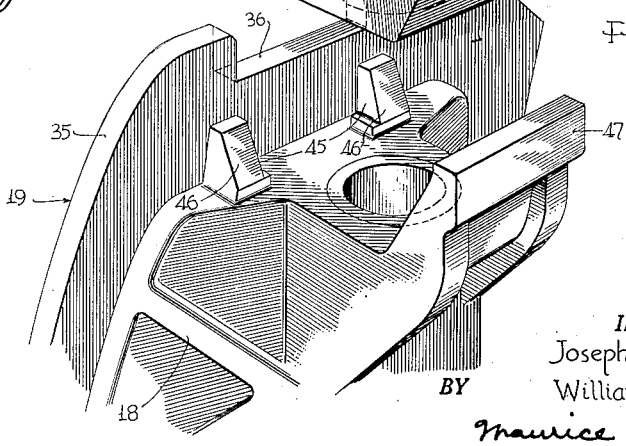
Fig. 5 is an enlarged fragmentary detail perspective view of the upper end of a brake head, and the shoe-clamping member associated therewith.

The face 42 of the head receiving the shoe is flat or planar and adapted to receive the flat face of the backing plate 35 of the shoe thereagainst. The brackets 30 or 31 each have an upward extension 43 engaging the outer face of the lower edge of the shoe and are further formed with a projection 44 which fits into the notch 36 at the adjacent end of the shoe so that the shoe is securely held in place at this lower end against movement away from the associated head or against movement in a plane parallel thereto. To similarly securely hold the opposite end of the shoe, the means shown in detail in Fig. 5 is provided. In this view, it will be seen that a pair of spaced projections 45 extend upwardly adjacent the flat face of the head, which projections have inclined cam faces 46 on their sides away from said face. Opposite the projections 42 is provided a flat top projection 47 extending in the same general direction as a line joining the projections 45.

These projections 45 and 47 are adapted to cooperate with similar faces, as 48 and 49, formed on a clamping head 50 through a loosely fitting opening in which the securing pin 25 is adapted to pass. The clamping head 50 is also formed with a slotted portion 51 adapted to fit between the ends of the notch 36 in the adjacent end of the shoe, the outer wall of this slotted portion engaging over the outer face of the backing plate 35 of the associated shoe 19. As the clamping head is placed downwardly with its slotted portion 51 engaged as just described with the shoe end, the inclined faces, as 48, formed by lugs, as 52, on the clamping head 50 engage the inclined faces 46 of the respective projections 45 and draw the upper end of the backing plate 35 of the shoe firmly against the head, as 18. The flat face 49 on the clamping head at the same time engages the flat top face of the projection 47, on which it can slide laterally, as required by the action of the cam surfaces 46, 48.

The clamping head 50 is then locked in the position shown in Fig. 3, right, by a spring-pressed cup washer 53 and a key 54.

To remove the shoe from the head, the key 54 is knocked out, after which the spring-pressed cup washer 53 and the clamping head 50 can be removed, and the shoe 19 can then be upwardly withdrawn from its engagement with the bracket, as 30.

It is believed that the operation of the device can be understood from the foregoing detailed description, and further description is, therefore, deemed superfluous.

While a specific form of the invention has been described in detail, it will be understood that changes and modifications may be made by those skilled in the art without departing from the spirit and scope of the invention.

What is claimed is:

1. In combination, a rotary brake disc having opposite faces, a brake head carrying a brake shoe designed for cooperation with one of the faces of said rotary brake disc, a similar but opposite such head carrying a brake shoe designed for cooperation with the other face of said disc, the lower ends of the heads being provided with removable and interchangeable similar brackets carrying parts for securing the shoes to the respective heads and further carrying interfitting parts of guiding means designed to maintain the brake heads parallel to each other and to the rotary brake disc.

2. In combination, a rotary brake disc having opposite faces, a brake head carrying a brake shoe designed for cooperation with one of the faces of said rotary brake disc, a similar but opposite such head carrying a brake shoe designed for cooperation with the other face of said disc, one pair of adjacent opposed ends of the heads being provided with removable and interchangeable similar brackets carrying parts for securing the shoes to the respective heads and carrying interfitting parts of guiding means designed to maintain the brake heads parallel to each other and to the rotary brake disc.

3. Brake mechanism for disc brakes comprising in combination, a brake head having a brake-shoe supporting face, a brake shoe comprising a metal backing plate and a brake lining secured to one face of the plate, and means securing the shoe upon the face of the brake head, said securing means comprising end projections on said backing plate extending beyond the brake lining and having end notches therein, and clamping means for said end projections of the metal backing plate, said clamping means having parts which fit in the end notches and parts which overlie the front face of the end projections of the backing plate, and means for applying endwise and normal-to-face pressure on said clamping means to secure the backing plate to the brake head, said brake head having a supporting and guide element for said clamping means providing movement thereof parallel to the backing plate, the means for applying endwise pressure on said clamping means comprising a spring and retaining means therefor carried by said guide element, and the means for causing normal-to-face pressure on said clamping means comprising interengaging cam elements on said clamping means and said head which cause said parts which overlie the front face of the backing plate to draw the backing plate against the supporting face as the clamping means moves down on the guide element.

4. Brake mechanism for disc brakes comprising in combination, a brake head having a brake-shoe supporting face, an arcuate-shaped segmental brake shoe carried by the brake head on its said face, the brake shoe comprising a metal backing plate and brake lining secured to one face of the plate, said backing plate having end projections extending beyond the brake lining, and said end projections having end interengaging elements which are symmetrical about a chordal axis of the arcuate segmental brake shoe, and clamping means having mating interengaging parts for the interengaging end parts of the said end projections of the metal backing plate, said clamping means also having elements which overlie the outer face of the backing plate projections, and means for securing said clamping means in endwise compression and axial or normal-to-face compression to said brake head, said brake head having a supporting and guide element for said clamping means providing movement thereof parallel to the backing plate, the means for applying endwise pressure on said clamping means comprising a spring and retaining means therefor carried by said guide element, and the means for causing normal-to-face pressure on said clamping means comprising interengaging cam elements on said clamping means and said head which cause said parts which overlie the front face of the backing plate to draw the backing plate against the supporting face as the clamping means moves down on the guide element.

JOSEPH H. COOMBES.
WILLIAM MANN.

References Cited in the file of this patent

UNITED STATES PATENTS

| Number | Name | Date |
| --- | --- | --- |
| 873,577 | Mick | Dec. 10, 1907 |
| 1,020,737 | Austin | Mar. 19, 1912 |
| 1,711,602 | Kindler | May 7, 1929 |
| 1,724,151 | Thompson | Aug. 13, 1929 |
| 1,757,273 | Thompson | May 6, 1930 |
| 1,796,433 | Blume | Mar. 17, 1931 |
| 1,827,081 | Gilles | Oct. 13, 1931 |
| 1,941,656 | Blume | Jan. 2, 1934 |
| 2,236,311 | Eksergian | Mar. 25, 1941 |
| 2,418,719 | Mann | Apr. 8, 1947 |
| 2,451,326 | Eksergian et al. | Oct. 12, 1948 |
| 2,451,329 | Gaenssle | Oct. 12, 1948 |